March 3, 1970 L. REY 3,498,662

AUTOMOBILE BATTERY CARRYING HANDLE

Filed Nov. 13, 1967

INVENTOR.

LOUIS REY

United States Patent Office 3,498,662

Patented Mar. 3, 1970

1

3,498,662

AUTOMOBILE BATTERY CARRYING HANDLE

Louis Rey, 8056 Carpenter Drive,
El Paso, Tex. 79907

Filed Nov. 13, 1967, Ser. No. 682,148
Int. Cl. B65g *7/12;* B65d *71/00;* A47j *45/00*
U.S. Cl. 294—26 4 Claims

ABSTRACT OF THE DISCLOSURE

A handle for conveniently carrying an automobile battery in a convenient manner and without having battery acid or dirt from coming into contact with the person, the device comprising a unit which is readily securable around existing batteries or which may be integrally built into future batteries to be produced.

This invention relates generally to automobile batteries. More specifically it relates to storage battery carrying means.

It is generally well known to those skilled in the art that storage batteries comprise relatively heavy weight objects which accordingly are very inconvenient to be manually picked up and carried, such as is frequently necessary when automobile batteries must be replaced or otherwise removed from the vehicle for recharging and the like. When carrying a heavy object such as an automobile storage battery, the same due to its cumbersome weight is likely to brush against a person's clothing and deposit oil or grease thereupon and further more spill battery acid therefrom upon the clothing. Such handling of storage batteries is accordingly inconvenient and in want of an improvement.

Accordingly it is a principal object of the present invention to provide an automobile battery carrying handle which provides a sure grasp around the battery and provides at the same time a convenient hand hold which may be grasped in a person's hand.

Another object of the present invention is to provide an automobile battery carrying handle which can be readily secured around existing batteries or which may be easily built into future produced storage batteries.

Other objects of the present invention are to provide an automobile battery carrying handle which is simple in design, inexpensive to manufacture, rugged in construction, easy to use and efficient in operation.

These and other objects will be readily evident upon a study of the following specification and the accompanying drawing wherein.

Figure 1:
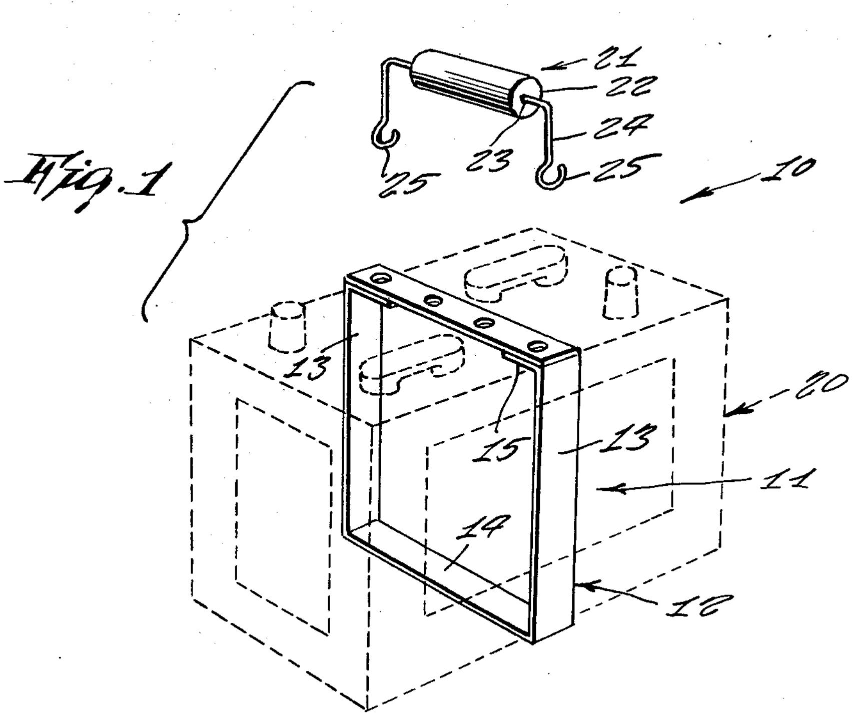
FIGURE 1 is a perspective exploded view of the present invention shown in relation to a storage battery.
Figure 2:
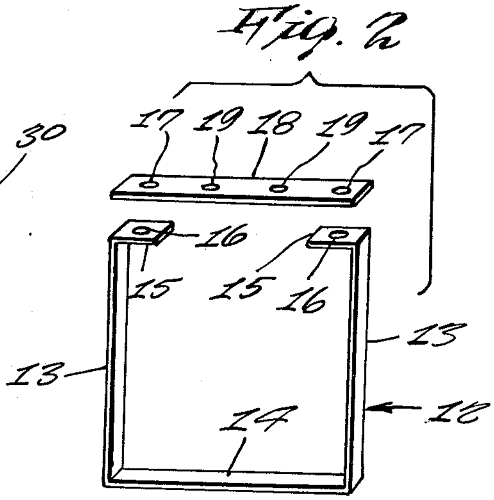
FIGURE 2 is a perspective view of one of the units illustrated in FIGURE 1, here shown exploded.

Referring now to the drawing in detail, the reference numeral 10 represents an automobile battery carrying handle, according to the present invention, wherein, as shown in FIGURES 1 and 2 of the drawing, there is a carrying handle assembly 11 that is readily attachable to existing automobile storage batteries. The assembly 11 include a generally U-shaped band 12 having parallel spaced apart legs 13 interconnected at their one ends by a connecting leg 14, the opposite ends of legs 13 having inwardly turned tabs 15, each of which is provided with an opening 16 therethrough which is in alignment with an opening 17 at each end of a metal strip 18. The linear strip 18 is further provided with a pair of additional

2 openings 19 therethrough for receiving any other auxiliary handle hooks. The band 12 is likewise made from steel or other metal so as to be relatively strong and capable of supporting a storage battery 20 around which the band 12 is placed, as shown in FIGURE 1 of the drawing.

In operative use the band is slipped over the storage battery until it is at the center thereof, the strip 18 is then placed threupon with the openings 16 and 17 in alignment with each other. A handle element 21 comprised of a roller 22 having a central opening 23 for receiving a U-shaped bale 24 is provided with a hook 25 at each end of the bale, the hooks 25 being receivable each through the openings 16 and 17, thereby securing the strip 18 to the band 12. A person now by simply grasping the roller 22 of the handle element 21, may lift the same and thus pick up the storage battery 20 in a convenient manner.

Figure 3:
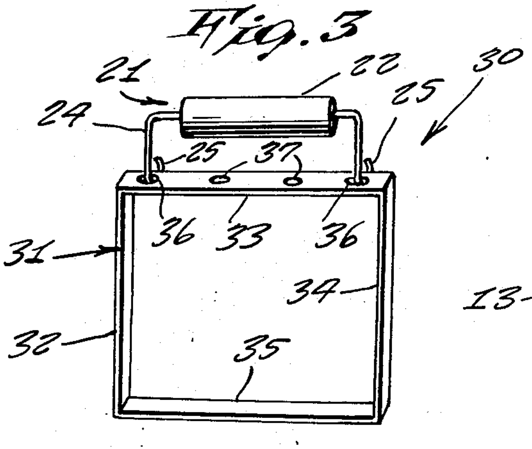
FIGURE 3 is a perspective view of a modified form of the present invention.
Figure 4:
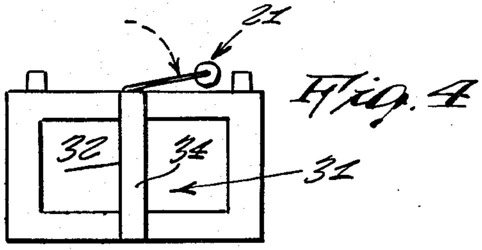
FIGURE 4 is a side elevation view thereof shown constructed into a storage battery.

In a modified form of the construction shown in FIGURES 3 and 4 of the drawing, the automobile battery carrying handle 30 is built into a storage battery 31 during the production of the battery. The automobile battery carrying handle 30 comprises a square configuration frame 31 made preferably from steel or other strong metal, the frame having parallel opposite sides 32, 33, 34 and 35, one of the sides 33 comprising an upper side and being provided with a plurality of openings 36 and 37 therethrough, the openings 36 being in outermost position and being adaptable for receiving a handle element 21 as above described and including hooks 25 which are receivable through the openings 36 of the frame 31. Auxiliary openings 37 are provided for use with auxiliary handle hooks. The frame 31 is centrally positioned, as shown in FIGURE 4 of the drawing, during molding operation of the battery case, 32.

Thus there has been shown an automobile battery carrying handle which will offer greater convenience for carrying a relatively heavy storage battery without the danger of getting acid and grease upon a person's clothing and which accordingly will make it more easy for a person to lift and transport that relatively heavy object.

While various changes may be made in the detailed construction, it is understood that such changes will be within the spirit and scope of the present invention.

I claim:

1. In an automobile battery carrying handle, the combination of: a rectangular configurated frame adapted to be centrally positioned around a storage battery, said frame comprising a generally U-shaped band portion having a pair of parallel, spaced apart, vertically extending legs connected at their lower ends to the opposite ends of a base strip, and an elongated top strip extending between the upper ends of said spaced legs, said top strip having at least two spaced apart openings therethrough; and a handle element associated with said frame, said handle element including a pair of downwardly extending spaced apart legs having hook means on the lower ends thereof arranged to be receivable through said spaced apart top strip openings, said hook means being engageable with said top strip when said handle element is lifted.

2. The combination as set forth in claim 1, wherein said handle element comprises: an elongated roller having a central opening extending therethrough; and a U-shaped bale, the base portion of said U-shaped bale extending through said opening of said roller, and said downwardly extending legs being connected to the opposite ends of said bale base portion.

3. The combination as set forth in claim 1, wherein said top strip is separate from said U-shaped band portion, the upper ends of said frame legs each having a horizontally disposed tab thereon, each of said tabs having a hole therethrough, said top strip being adapted to rest on said tabs with said spaced openings therein aligned with said tab holes, whereby said handle element hook means can be passed through both said openings and said holes and are engageable with said tabs and said top strip.

4. The combination as set forth in claim 1, wherein the opposite ends of said top strip are permanently secured to the upper ends of said frame legs, said frame being disposed around the center of said storage battery and being incorporated into said battery during the molding thereof.

References Cited

UNITED STATES PATENTS

| | | | |
|---|---|---|---|
| 1,803,755 | 5/1931 | Goez | 294—27 |
| 2,571,433 | 10/1951 | Fine | 294—31.2 |
| 3,262,727 | 7/1966 | Blackaby | 224—45 |

FOREIGN PATENTS

| | | |
|---|---|---|
| 382,716 | 11/1932 | Great Britain. |

HARVEY C. HORNSBY, Primary Examiner

U.S. Cl. X.R.

224—45; 294—31.2